United States Patent [19]

Kaljee et al.

[11] Patent Number: 4,517,441

[45] Date of Patent: May 14, 1985

[54] WELDING ELECTRODE

[75] Inventors: Jan Kaljee, Brits; Leo J. Lalor, Benoni; Sergio M. Pagani, Braamfontein; Frederick P. A. Robinson, Sandton, all of South Africa

[73] Assignee: Nasionale Sweisware (Eiendoms) Beperk, Transvaal, South Africa

[21] Appl. No.: 550,544

[22] Filed: Nov. 10, 1983

[30] Foreign Application Priority Data

Nov. 12, 1982 [ZA] South Africa ............... 82/8340

[51] Int. Cl.³ .................. B23K 35/22; B23K 35/362
[52] U.S. Cl. ........................ 219/146.23; 219/145.23
[58] Field of Search ......... 219/145.23, 146.1, 146.23, 219/146.24, 146.32, 146.41

[56] References Cited

U.S. PATENT DOCUMENTS

| | | | |
|---|---|---|---|
| 2,408,620 | 10/1946 | Friedlander | 219/8 |
| 2,861,013 | 11/1958 | Sarazin et al. | 117/207 |
| 2,990,301 | 6/1961 | Clemens | 219/146 |
| 3,139,507 | 6/1964 | Kaesmacher | 219/74 |
| 3,394,238 | 7/1968 | Wilcox | 219/73 |
| 3,767,888 | 10/1973 | Sullivan | 219/146 |
| 4,091,253 | 5/1978 | Bagshaw et al. | 219/76.14 |
| 4,143,258 | 3/1979 | McCann et al. | 219/73 |
| 4,363,952 | 12/1982 | Onishi et al. | 219/76.12 |

FOREIGN PATENT DOCUMENTS

| | | |
|---|---|---|
| 1050639 | 2/1959 | Fed. Rep. of Germany . |
| 156895 | 9/1982 | Japan . |
| 390256 | 4/1933 | United Kingdom . |
| 501721 | 3/1939 | United Kingdom . |
| 576523 | 4/1946 | United Kingdom . |
| 616284 | 1/1949 | United Kingdom . |
| 808496 | 2/1959 | United Kingdom . |
| 897045 | 5/1962 | United Kingdom . |
| 1085967 | 10/1967 | United Kingdom . |
| 1248985 | 10/1971 | United Kingdom . |
| 1300286 | 12/1972 | United Kingdom . |
| 1310150 | 3/1973 | United Kingdom . |
| 1475072 | 6/1977 | United Kingdom . |
| 1540855 | 2/1979 | United Kingdom . |
| 2068813 | 8/1981 | United Kingdom . |
| 812483 | 3/1981 | U.S.S.R. . |

OTHER PUBLICATIONS

British Patent Abridgment No. 1,466,163; August--Thyssen-Hutte, AG, Apr. 18, 1974.
British Patent Abridgment No. 1,527,674; Kobe Steel, Ltd., Mar. 17, 1976.
British Patent Abridgment No. 980,357; Murex Welding Processes Ltd., Sep. 12, 1963.
British Patent Abridgment No. 1,233,291; Kobe Steel Ltd., Feb. 28, 1969.
British Patent Abridgment No. 1,239,587; Bofors, A. B., Nov. 18, 1968.
British Patent Abridgment No. 352,714; Inventor Delachaux, L. C., Jun. 30, 1930.
British Patent Abridgment No. 689,437; Babcock & Wilcox, Ltd., Jun. 14, 1951.
British Patent Abridgment No. 949,587; Murex Welding Processes, Ltd., Jun. 14, 1962.

*Primary Examiner*—Roy N. Envall, Jr.
*Assistant Examiner*—Catherine M. Sigda
*Attorney, Agent, or Firm*—Bernard, Rothwell & Brown

[57] ABSTRACT

A welding electrode is provided which is suitable for welding chromium containing ferritic corrosion resistant steels. The electrode comprises a low-carbon manganese steel core wire having a carbon content of less than 0.1% by mass, and a manganese content of 0.35–0.60% by mass. The electrode has a basic chromium alloyed flux coating, which upon welding, deposits a low-carbon chromium martensitic ferritic weld metal comprising about 90% by mass low carbon martensite and about 10% by mass ferrite and having a carbon content of less than 0.04% by mass.

16 Claims, No Drawings

WELDING ELECTRODE

THIS INVENTION relates to a welding electrode. In particular it relates to a welding electrode suitable for welding chromium-ferritic corrosion resistant steels.

According to the invention, a welding electrode suitable for welding chromium-containing ferritic corrosion resistant steels comprises a low-carbon manganese steel core wire having a carbon content of less than 0.1% by mass, and a manganese content of 0.35–0.60% by mass, and a basic chromium alloyed flux coating, the electrode upon welding, depositing a low-carbon chromium martensitic ferritic weld metal having a carbon content of less than 0.04% by mass.

The core wire may have the following composition on a mass basis:

| CONSTITUENT | % mass/mass (m/m) |
| --- | --- |
| Carbon (C) | 0.10 maximum (max) |
| Silicon (Si) | 0.03 max |
| Manganese (Mn) | 0.35–0.60 |
| Phosphorous (P) | 0.025 max |
| Sulphur (S) | 0.025 max |
| Copper (Cu) | 0.1 max |
| Chromium (Cr) | 0.2 max. |
| Nickel (Ni) | 0.2 max. |
| Molybdenum (Mo) | 0.2 max. |
| Iron (Fe) | Balance |

More specifically, the core wire may have the following composition on a mass basis:

| Constituent | % m/m |
| --- | --- |
| C | 0.05 max. |
| Si | 0.02 max. |
| Mn | 0.35–0.60 |
| P | 0.025 max. |
| S | 0.025 max. |
| Cu | 0.05 max. |
| Cr | 0.10 max. |
| Ni | 0.10 max. |
| Mo | 0.10 max. |
| Fe | Balance |

The flux coating may have the following composition on a dry mass basis:

| Constituent | % m/m |
| --- | --- |
| $SiO_2$ | 10–15 |
| $TiO_2$ | 3–10 |
| Fe | 8 max. |
| $Al_2O_3$ | 2 max. |
| CaO | 10–15 |
| Mo | 3 max. |
| Mn | 1–3 |
| $CaF_2$ | 15–25 |
| $CO_2$ | 10–15 |
| Cr | 20–25 |
| Ni | 5–12 |
| $Na_2O$ | 2 max. |
| $K_2O$ | 1–4 |

More specifically, the flux coating may have the following composition on a dry mass basis:

| Constituent | % m/m |
| --- | --- |
| $SiO_2$ | 11–12 |
| $TiO_2$ | 4–6 |
| Fe | 4 max. |
| $Al_2O_3$ | 1 max. |
| CaO | 11–13 |
| Mo | 2 max. |
| Mn | 1–2 |
| $CaF_2$ | 18–22 |
| $CO_2$ | 12–14 |
| Cr | 21–23 |
| Ni | 7–10 |
| $Na_2O$ | 1 max. |
| $K_2O$ | 1–2 |

By a "dry mass basis" is meant that the composition is calculated ignoring any water in the flux coating. Typically, however, the flux coating will contain a small proportion of water, with a moisture content of less than 0.30% by mass.

The electrode, upon welding, may deposit a martensitic ferritic weld metal having the following composition on a mass basis:

| Constituent | % m/m |
| --- | --- |
| C | 0.04 max. |
| Si | 0.90 max. |
| Mn | 0.50–1.00 |
| Cr | 11.5–13.00 |
| Ni | 4.0–5.0 |
| Mo | 0.30–0.70 |
| S | 0.025 max. |
| Cu | 0.15 max. |
| P | 0.025 max. |

More specifically, upon welding, the electrode may deposit a martensitic ferritic weld metal having the following composition on a mass basis:

| Constituent | % m/m |
| --- | --- |
| C | 0.04 max. |
| Si | 0.45 max. |
| Mn | 0.60–0.90 |
| Cr | 12.0–13.0 |
| Ni | 4.0–5.0 |
| Mo | 0.40–0.70 |
| S | 0.015 max. |
| Cu | 0.10 max. |
| P | 0.020 max. |
| Niobium | 0.05 max. |
| Nitrogen | 0.03 max. |

The coating may be an extrusion, ie it may be extruded around the core wire and may be substantially concentric around the core wire. The electrode may have its strike end carbon sprayed, the flux coating being preferably completely bound to the core wire along its usable length. Typical electrode dimensions are as follows:

| Core Wire Nominal Diameter mm | Coating Diameter mm | Length mm | Eccentricity mm |
| --- | --- | --- | --- |
| 2.50 | 4.25 ± 0.05 | 300 | 0.08 |
| 3.15 | 5.35 ± 0.05 | 350 | 0.10 |
| 4.00 | 6.70 ± 0.05 | 350 | 0.12 |
| 5.00 | 8.50 ± 0.05 | 450 | 0.15 |

EXAMPLE

Electrodes of the dimensions given above were made in accordance with American Welding Society Specification A5.4-1978, with the following composition on a mass basis:

| Core Wire | | Flux Coating | |
| --- | --- | --- | --- |
| Constituent | % m/m | Constituent | % m/m |
| C | 0.05 max | $SiO_2$ | 11.5 |
| Si | 0.02 max | $TiO_2$ | 5.0 |
| Mn | 0.35–0.60 | Fe | 2.4 |
| P | 0.025 max | $Al_2O_3$ | 0.4 |
| S | 0.025 max | CaO | 12.0 |
| Cu | 0.05 max | Mo | 1.0 |
| Cr | 0.10 max | Mn | 1.7 |
| Ni | 0.10 max | $CaF_2$ | 20.0 |
| Mo | 0.10 max | $CO_2$ | 13.3 |
| Fe | Balance | Cr | 22.0 |
| | | Ni | 8.8 |
| | | $Na_2O$ | 0.5 |
| | | $K_2O$ | 1.4 |

Various electrodes were made, differing only in Mn content of the core wire as set out above, the Mn content varying from 0.35–0.60% m/m. In each case the moisture content of the flux coating was kept below 0.30% m/m.

It was found that electrodes in accordance with the example were suitable for welding chromium containing ferritic corrosion resistant steels, particularly those containing 11.5–13.0% m/m chromium, after plate preparation according to American Welding Society Specifications A5.4-1978. Such steels include AISI 410-type steels BX5 CrNi 13 4-type and GX5 CrNi 13 4-type steels, and particularly the chromium containing ferritic corrosion resistant steel manufactured and marketed by Middelburg Steel Alloys (Proprietary) Limited under the trade designation "3CR12", and containing about 12% m/m chromium, Electrodes in accordance with the example are hydrogen-controlled basic coated electrodes. They can be characterised as heavily coated chromium alloy electrodes and have been found to be suitable for all position welding (flat, horizontal, verrtical-upwards and overhead positions) and produced sound, low-inclusion weld metal which is resistant to cracking in the weld and in the heat-affected zone, and which exhibited good weld metal toughness at temperatures as low as −20° C. The electrodes were found to provide smooth, stable arcs on DC positive polarity, and gave satisfactory welding performance on AC at a minimum open current voltage of 70V. Suitable welding currents, for various electrode diameters, were found to be as follows:

| Electrode Diameter mm | Welding Current Amps |
| --- | --- |
| 2.50 | 70–90 |
| 3.15 | 80–130 |
| 4.00 | 125–160 |
| 5.00 | 170–240 |

No overheating was found in these current ranges.

Electrodes in accordance with the example could be classified as follows:

| AWS A5.4 | E410NiMo-16 |
| --- | --- |
| DIN 8556 | E13.4B26 120 |
| ISO 3581 | E13.4B120 26 |

A weld metal was obtained with the following typical analysis:

| Constituent | % m/m |
| --- | --- |
| C | 0.03 |
| Si | 0.45 |
| Mn | 0.80 |
| Cr | 12.0 |
| Ni | 4.8 |
| Mo | 0.6 |
| S | 0.015 |
| Cu | 0.06 |
| P | 0.020 |
| Niobium | less than 0.05 |
| Nitrogen | less then 0.03 |
| Fe | balance |

The weld metal, as welded, was found to have the following mechanical properties:

| Property | Value |
| --- | --- |
| 0.2% Proof Stress | 700 MPa minimum |
| Ultimate Tensile Strength | 900–1150 MPa |
| Elongation (L = 5d) | 10–15% |
| Charpy V-Impact at 20° C. | 40–50 J |
| at −20° C. | 30–40 J |

When stress-relieved at 650° C. for 1 hour, the weld metal had the following mechanical properties:

| Property | Value |
| --- | --- |
| 0.2% Proof Stress | 600 MPa |
| Ultimate Tensile Strength | 800–1000 MPa |
| Elongation (L = 5d) | 15% minimum |
| Charpy V-Impact at 20° C. | 65–75 J |
| at −20° C. | 55–65 J |

The invention thus provides a basic, heavily coated hydrogen-controlled electrode with a low carbon and manganese content in its core wire which deposits a low carbon chromium ferritic weld metal which matches the properties of chromium ferritic steels such as 3CR12. The low carbon and manganese content in the core wire combats overheating, and the flux coating composition promotes all position welding. The weld metal has a low carbon and nitrogen content and is of a chromium/nickel/molybdenum/hydrogen controlled type which has a fine-grained ferritic martensitic microstructure having desirable metallurgical properties and excellent toughness at temperatures down to −20° C. Its hydrogen is below 5 ml/100g deposited weld metal (typically below 3 ml/100g).

Chromium containing ferritic corrosion resistant steels such as 3CR12 are typically welded with electrodes which provide a completely dissimilar weld metal, ie a weld metal having an austenitic ferritic microstructure which is more noble and more highly alloyed than the steel being welded, and containing typically 20–25% m/m chromium, 8–14% m/m nickel and 0–3% m/m molybdenum. Apart from their higher cost, these electrodes have a relatively low welding current capability, and the composition and structure of the weld metal leads to preferential galvanic corrosion in chemically active environments, leading to the potential failure of welded structures. In contrast, the weld metal of the present invention, as mentioned above, is martensitic-ferritic in structure and has a significantly lower chromium content of about 12%. Such a weld metal would normally be expected to have a coarse grained microstructure with low impact properties. However, the weld metal of the present invention has been found to have a good fine grained microstructure with adequate resistance to impact. The fine grained structure of the weld metal consists of 90–99% low carbon martensite and 1–10% ferrite.

Without being bound by theory, the applicant believes that the desirable properties of the present electrode arise from the low carbon and nitrogen content of the weld metal, in combination with particular proportions of chromium, molybdenum, nickel and manganese, together with a low sulphur and phosphorous content. A weld metal is obtained in which there is a low interstitial carbon and nitrogen content, leading to its fine grained microstructure and good mechanical properties. This is achieved at relatively low cost, while the composition of the weld metal is designed to minimize the possibility of preferential galvanic corrosion.

What is claimed is:

1. A welding electrode suitable for welding chromium containing ferritic corrosion resistant steels which comprises a low-carbon manganese steel core wire having a carbon content of less than 0.1% by mass, and a manganese content of 0.35–0.60% by mass, and a basic chromium alloyed flux coating, the electrode, upon welding, depositing a low-carbon chromium martensitic ferritic weld metal having a carbon content of less than 0.04% by mass, the core wire having the following composition on a mass basis:

| CONSTITUENT | % mass/mass (m/m) |
| --- | --- |
| Carbon (C) | 0.10 maximum (max) |
| Silicon (Si) | 0.03 max. |
| Manganese (Mn) | 0.35–0.60 |
| Phosphorous (P) | 0.025 max. |
| Sulphur (S) | 0.025 max. |
| Copper (Cu) | 0.1 max. |
| Chromium (Cr) | 0.2 max. |
| Nickel (Ni) | 0.2 max. |
| Molybdenum (Mo) | 0.2 max. |
| Iron (Fe) | Balance. |

2. An electrode as claimed in claim 1, in which the core wire has the following composition on a mass basis:

| Constituent | % m/m |
| --- | --- |
| C | 0.05 max. |
| Si | 0.02 max. |
| Mn | 0.35–0.60 |
| P | 0.025 max. |
| S | 0.025 max. |
| Cu | 0.05 max. |
| Cr | 0.10 max. |
| Ni | 0.10 max. |
| Mo | 0.10 max. |
| Fe | Balance. |

3. An electrode as claimed in claim 1, in which the flux coating has the following composition on a dry mass basis:

| Constituent | % m/m |
| --- | --- |
| $SiO_2$ | 10–15 |
| $TiO_2$ | 3–10 |
| Fe | 8 max. |
| $Al_2O_3$ | 2 max. |
| CaO | 10–15 |
| Mo | 3 max. |
| Mn | 1–3 |
| $CaF_2$ | 15–25 |
| $CO_2$ | 10–15 |
| Cr | 20–25 |
| Ni | 5–12 |
| $Na_2O$ | 2 max. |
| $K_2O$ | 1–4. |

4. An electrode as claimed in claim 3, in which the flux coating has the following composition on a dry mass basis:

| Constituent | % m/m |
| --- | --- |
| $SiO_2$ | 11–12 |
| $TiO_2$ | 4–6 |
| Fe | 4 max. |
| $Al_2O_3$ | 1 max. |
| CaO | 11–13 |
| Mo | 2 max. |
| Mn | 1–2 |
| $CaF_2$ | 18–22 |
| $CO_2$ | 12–14 |
| Cr | 21–23 |
| Ni | 7–10 |
| $Na_2O$ | 1 max. |
| $K_2O$ | 1–2. |

5. An electrode as claimed in claim 1, which, upon welding, deposits a martensitic ferritic weld metal having the following composition on a mass basis:

| Constituent | % m/m |
| --- | --- |
| C | 0.04 max. |
| Si | 0.90 max. |
| Mn | 0.5–1.00 |
| Cr | 11.5–13.00 |
| Ni | 4.0–5.0 |
| Mo | 0.30–0.70 |
| S | 0.025 max. |
| Cu | 0.15 max. |
| P | 0.025 max. |

6. An electrode as claimed in claim 5, which, upon welding, deposits a weld metal having the following composition:

| Constituent | % m/m |
| --- | --- |
| C | 0.04 max. |
| Si | 0.45 max. |
| Mn | 0.60–0.90 |
| Cr | 12.0–13.0 |
| Ni | 4.0–5.0 |
| Mo | 0.40–0.70 |
| S | 0.015 max. |
| Cu | 0.10 max. |
| P | 0.020 max. |
| Niobium (Nb) | 0.05 max. |
| Nitrogen (N) | 0.03 max. |

7. A welding electrode suitable for welding chromium containing ferritic corrosion resistant steels which comprises a low-carbon manganese steel core wire having a carbon content of less than 0.1% by mass, and a manganese content of 0.35–0.60% by mass, and a basic chromium alloyed flux coating, the electrode, upon welding, depositing a low-carbon chromium martensitic ferritic weld metal having a carbon content of less than 0.04% by mass, the flux coating having the following composition on a dry mass basis:

| Constituent | % m/m |
| --- | --- |
| SiO₂ | 10–15 |
| TiO₂ | 3–10 |
| Fe | 8 max. |
| Al₂O₃ | 2 max. |
| CaO | 10–15 |
| Mo | 3 max. |
| Mn | 1–3 |
| CaF₂ | 15–25 |
| CO₂ | 10–15 |
| Cr | 20–25 |
| Ni | 5–12 |
| Na₂O | 2 max. |
| K₂O | 1–4. |

8. An electrode as claimed in claim 7, in which the flux coating has the following composition on a dry mass basis:

| Constituent | % m/m |
| --- | --- |
| SiO₂ | 11–12 |
| TiO₂ | 4–6 |
| Fe | 4 max. |
| Al₂O₃ | 1 max. |
| CaO | 11–13 |
| Mo | 2 max. |
| Mn | 1–2 |
| CaF₂ | 18–22 |
| CO₂ | 12–14 |
| Cr | 21–23 |
| Ni | 7–10 |
| Na₂O | 1 max. |
| K₂O | 1–2. |

9. An electrode as claimed in claim 7, which, upon welding, deposits a martensitic ferritic weld metal having the following composition on a mass basis:

| Constituent | % m/m |
| --- | --- |
| C | 0.04 max. |
| Si | 0.90 max. |
| Mn | 0.50–1.00 |
| Cr | 11.5–13.00 |
| Ni | 4.0–5.0 |
| Mo | 0.30–0.70 |
| S | 0.025 max. |
| Cu | 0.15 max. |
| P | 0.025 max. |

10. An electrode as claimed in claim 9, which, upon welding, deposits a weld metal having the following composition:

| Constituent | % m/m |
| --- | --- |
| C | 0.04 max. |
| Si | 0.45 max. |
| Mn | 0.60–0.90 |
| Cr | 12.0–13.0 |
| Ni | 4.0–5.0 |
| Mo | 0.40–0.70 |
| S | 0.015 max. |
| Cu | 0.10 max. |
| P | 0.020 max. |
| Niobium (Nb) | 0.05 max. |
| Nitrogen (N) | 0.03 max. |

11. A welding electrode suitable for welding chromium containing ferritic corrosion resistant steels which comprises a low-carbon manganese steel core wire having a carbon content of less than 0.1% by mass, and a manganese content of 0.35–0.60% by mass, and a basic chromium alloyed flux coating, the electrode, upon welding, depositing a low-carbon chromium martensitic ferritic weld metal having the following composition on a mass basis:

| Constituent | % m/m |
| --- | --- |
| C | 0.04 max. |
| Si | 0.90 max. |
| Mn | 0.50–1.00 |
| Cr | 11.5–13.00 |
| Ni | 4.0–5.0 |
| Mo | 0.30–0.70 |
| S | 0.025 max. |
| Cu | 0.15 max. |
| P | 0.025 max. |

12. An electrode as claimed in claim 11, which, upon welding, deposits a weld metal having the following composition:

| Constituent | % m/m |
| --- | --- |
| C | 0.04 max. |
| Si | 0.45 max. |
| Mn | 0.60–0.90 |
| Cr | 12.0–13.0 |
| Ni | 4.0–5.0 |
| Mo | 0.40–0.70 |
| S | 0.015 max. |
| Cu | 0.10 max. |
| P | 0.020 max. |
| Niobium (Nb) | 0.05 max. |
| Nitrogen (N) | 0.03 max. |

13. A welding electrode suitable for welding chromium containing ferritic corrosion resistant steels which comprises a low-carbon manganese steel core wire having a carbon content of less than 0.1% by mass, and a manganese content of 0.35–0.60% by mass, and a basic chromium alloyed flux coating, the electrode, upon welding, depositing a low-carbon chromium martensitic ferritic weld metal, the core wire having the following composition on a mass basis:

| Constituent | % m/m |
| --- | --- |
| Carbon (C) | 0.10 max. |
| Silicon (Si) | 0.03 max. |
| Manganese (Mn) | 0.35–0.60 |
| Phosphorous (P) | 0.025 max. |
| Sulphur (S) | 0.025 max. |
| Copper (Cu) | 0.1 max. |
| Chromium (Cr) | 0.2 max. |
| Nickel (Ni) | 0.2 max. |
| Molybdenum (Mo) | 0.2 max. |
| Iron (Fe) | Balance. | the flux coating having the following composition on a dry mass basis:

| Constituent | % m/m |
| --- | --- |
| SiO$_2$ | 10-15 |
| TiO$_2$ | 3-10 |
| Fe | 8 max. |
| Al$_2$O$_3$ | 2 max. |
| CaO | 10-15 |
| Mo | 3 max. |
| Mn | 1-3 |
| CaF$_2$ | 15-25 |
| CO$_2$ | 10-15 |
| Cr | 20-25 |
| Ni | 5-12 |
| Na$_2$O | 2 max. |
| K$_2$O | 1-4, and | the weld metal having the following composition on a mass basis:

| Constituent | % m/m |
| --- | --- |
| C | 0.04 max. |
| Si | 0.90 max. |
| Mn | 0.50-1.00 |
| Cr | 11.5-13.00 |
| Ni | 4.0-5.0 |
| Mo | 0.30-0.70 |
| S | 0.025 max. |
| Cu | 0.15 max. |
| P | 0.025 max. |

14. An electrode as claimed in claim 13, in which the core wire has the following composition on a mass basis:

| Constituent | % m/m |
| --- | --- |
| C | 0.05 max. |
| Si | 0.02 max. |
| Mn | 0.35-0.60 |
| P | 0.025 max. |
| S | 0.025 max. |
| Cu | 0.05 max. |
| Cr | 0.10 max. |
| Ni | 0.10 max. |
| Mo | 0.10 max. |
| Fe | Balance. |

15. An electrode as claimed in claim 13, in which the flux coating has the following composition on a dry mass basis:

| Constituent | % m/m |
| --- | --- |
| SiO$_2$ | 11-12 |
| TiO$_2$ | 4-6 |
| Fe | 4 max. |
| Al$_2$O$_3$ | 1 max. |
| CaO | 11-13 |
| Mo | 2 max. |
| Mn | 1-2 |
| CaF$_2$ | 18-22 |
| CO$_2$ | 12-14 |
| Cr | 21-23 |
| Ni | 7-10 |
| Na$_2$O | 1 max. |
| K$_2$O | 1-2. |

16. An electrode as claimed in claim 13, which, upon welding, deposits a weld metal having the following composition on a mass basis:

| Constituent | % m/m |
| --- | --- |
| C | 0.04 max. |
| Si | 0.45 max. |
| Mn | 0.60-0.90 |
| Cr | 12.0-13.0 |
| Ni | 4.0-5.0 |
| Mo | 0.40-0.70 |
| S | 0.015 max. |
| Cu | 0.10 max. |
| P | 0.020 max. |
| Niobium (Nb) | 0.05 max. |
| Nitrogen (N) | 0.03 max. |

* * * * *